(12) United States Patent
Nakayama et al.

(10) Patent No.: US 10,487,873 B2
(45) Date of Patent: Nov. 26, 2019

(54) LINEAR GUIDE DEVICE AND ACTUATOR

(71) Applicant: SMC CORPORATION, Chiyoda-ku (JP)

(72) Inventors: Toru Nakayama, Soka (JP); Toru Sugiyama, Abiko (JP); Ryuichi Masui, Bando (JP)

(73) Assignee: SMC CORPORATION, Chiyoda-ku (JP)

( * ) Notice: Subject to any disclaimer, the term of this patent is extended or adjusted under 35 U.S.C. 154(b) by 215 days.

(21) Appl. No.: 15/509,543

(22) PCT Filed: Sep. 11, 2014

(86) PCT No.: PCT/JP2014/074068
§ 371 (c)(1),
(2) Date: Mar. 8, 2017

(87) PCT Pub. No.: WO2016/038720
PCT Pub. Date: Mar. 17, 2016

(65) Prior Publication Data
US 2017/0298984 A1    Oct. 19, 2017

(51) Int. Cl.
*F16C 29/02*        (2006.01)
*F16C 29/00*        (2006.01)
(Continued)

(52) U.S. Cl.
CPC ............ *F16C 29/02* (2013.01); *F16C 29/002* (2013.01); *F16C 33/043* (2013.01); *F16H 25/20* (2013.01);
(Continued)

(58) Field of Classification Search
CPC .... F16H 2025/204; F16H 25/20; F16C 29/02; F16C 33/043
See application file for complete search history.

(56) References Cited

U.S. PATENT DOCUMENTS 3,858,452 A * 1/1975 Gatland .............. F16H 25/2025
74/424.78
5,694,811 A * 12/1997 Tsukada .............. F16C 29/0642
384/13

(Continued)

FOREIGN PATENT DOCUMENTS

DE    20106914 U1    10/2002
JP    4-58620 U      5/1992
(Continued)

OTHER PUBLICATIONS

International Search Report dated Nov. 11, 2014 in PCT/JP2014/074068 filed Sep. 11, 2014.
(Continued)

*Primary Examiner* — David M Fenstermacher
(74) *Attorney, Agent, or Firm* — Oblon, McClelland, Maier & Neustadt, L.L.P.

(57) ABSTRACT

A linear guide device including an actuator including: a base section; a slider slidably provided to the base section; and guide sections disposed between the base section and the slider in a state that the guide sections are extending in the sliding direction of the slider. DLC films are formed on the guide sections, and the guide sections are locked to the slider such that the guide section can slide in a state that the DLC films are applying a predetermined preload with respect to the base section.

7 Claims, 10 Drawing Sheets

(51) Int. Cl.
*F16C 33/04* (2006.01)
*F16H 25/20* (2006.01)

(52) U.S. Cl.
CPC .... *F16C 2206/04* (2013.01); *F16H 2025/204* (2013.01)

(56) References Cited

U.S. PATENT DOCUMENTS

| | | | |
|---|---|---|---|
| 6,191,548 B1* | 2/2001 | Kajita | B23Q 1/58 318/568.18 |
| 9,010,205 B2* | 4/2015 | Schroeder | F16H 25/20 74/89.32 |
| 2005/0109139 A1 | 5/2005 | Nagai et al. | |

FOREIGN PATENT DOCUMENTS

| | | |
|---|---|---|
| JP | 2003-161319 A | 6/2003 |
| JP | 2003-314546 A | 11/2003 |
| JP | 2005-172082 A | 6/2005 |
| JP | 2005-172234 A | 6/2005 |
| JP | 2010-133438 A | 6/2010 |
| JP | 2014-59000 A | 4/2014 |

OTHER PUBLICATIONS

Office Action dated Aug. 28, 2019 in Indian Patent Application No. 201747008023 w/English translation.

* cited by examiner

LINEAR GUIDE DEVICE AND ACTUATOR

TECHNICAL FIELD

The present invention relates to a linear guide device on which a slider is slidably disposed on a base member through guide members, and an actuator with such a linear guide device.

BACKGROUND ART

Conventionally, an electric actuator has been widely used by which a slider is made to slide with respect to a base member of a linear guide device by rotating a feed screw shaft under the action of a motor. In this type of linear guide device, for example, as disclosed in Japanese Laid-Open Patent Publication No. 2010-133438, a technical concept is disclosed in which a cylindrical guide member is disposed between a slider and an aluminum base member, while a predetermined gap is formed between the base member and the guide member (between the slider and the guide member).

Further, for example, in Japanese Laid-Open Patent Publication No. 2014-059000, a technical concept is disclosed by which wear is reduced by forming a diamond-like carbon (DLC) film on a sliding surface of an aluminum alloy.

SUMMARY OF INVENTION

According to the conventional technique disclosed in Japanese Laid-Open Patent Publication No. 2010-133438, since a predetermined gap is formed between the base member and the guide member (between the slider and the guide member), looseness or rattling may occur in the slider. When the guide member is installed without forming such a gap in order to suppress the occurrence of rattling, since sliding resistance between the guide member and the base member increases, a problem results in that it becomes impossible for the slider to slide smoothly with respect to the base member. In this instance, if the diamond-like carbon film described in Japanese Laid-Open Patent Publication No. 2014-059000 were formed on the sliding surface of the base member in order to reduce such sliding resistance, since it is necessary for the diamond-like carbon film to be formed to span across substantially the entire length of the base member, a soaring rise in costs occurs.

The present invention has been devised in consideration of the problems noted above, and has the object of providing a linear guide device and an actuator, in which a slider can be made to slide smoothly with respect to a base member without the occurrence of backlash or rattling, together with achieving a reduction in costs.

In order to achieve the aforementioned object, a linear guide device according to the present invention includes a base member, a slider disposed slidably on the base member, and a guide member, which is disposed between the base member and the slider so as to extend in a slide direction of the slider, wherein a diamond-like carbon film is formed on the guide member, and the guide member is fixed by engagement with the slider in a manner in which the diamond-like carbon film is slidable in a state of applying a predetermined pre-load to the base member.

In accordance with such a configuration, since the guide member is fixed by engagement with the slider such that the diamond-like carbon film formed on the guide member is slidable while the diamond-like carbon film applies a predetermined pre-load to the base member, it is possible for the slider to slide smoothly with respect to the base member without the occurrence of rattling, together with achieving a reduction in costs.

In the above-described linear guide device, preferably, an installation groove in which the guide member is arranged is formed in the slider, and the guide member is configured to be spring deformable, and is fixed by engagement with a wall surface of the installation groove by a spring restorative force of the guide member. In accordance with such a configuration, using the spring restorative force of the guide member, the guide member can reliably be engaged with and fixed to the slider.

In the above-described linear guide device, the guide member preferably is made of spring steel formed in a C-shaped cross section. In accordance with this configuration, since the guide member can be subjected to spring deformation with a simple structure, it is possible to achieve a further reduction in costs.

In the above-described linear guide device, the diamond-like carbon film is preferably formed on an outer peripheral surface of the guide member. In accordance with such a structure, the diamond-like carbon film can reliably be placed in contact with a sliding surface of the base member.

In the above-described linear guide device, a slide groove having a shape that corresponds with the shape of the guide member preferably is formed in the base member. In accordance with this configuration, the slider can be made to slide more smoothly with respect to the base member.

In the above-described linear guide device, a lubricant may be contained in an inner hole of the guide member, and the guide member may be disposed between the base member and the slider in such a manner that a side hole, which opens on the outer peripheral surface of the guide member, is positioned in the slide groove. In accordance with such a configuration, the lubricant accommodated in the inner hole of the guide member can be supplied between the diamond-like carbon film and the wall surface that makes up the slide groove, and therefore, by further reducing sliding resistance, the slider is capable of sliding more smoothly with respect to the base member.

In the above-described linear guide device, a notch may be formed in a portion of a wall surface of the slide groove that faces toward the side hole. In accordance with such a configuration, the lubricant accommodated in the inner hole of the guide member can be supplied efficiently through the notch between the diamond-like carbon film and the wall surface that makes up the slide groove. Further, it is possible to suitably suppress the corner portions (edge portions), which are formed at the boundary between the wall surface of the side hole and the outer peripheral surfaces of the guide member, from hitting against and causing damage to the wall surface of the slide groove.

In the above-described linear guide device, a notch containing a lubricant therein may be formed in a wall surface of the slide groove. Since the lubricant accommodated in the notch can be supplied between the diamond-like carbon film and the wall surface that makes up the slide groove, sliding resistance is further reduced, and the slider can slide more smoothly with respect to the base member.

An actuator according to the present invention includes a linear guide device, and a drive unit configured to drive a slider of the linear guide device, wherein the linear guide device is the linear guide device having any of the features described above. In accordance with the above structure, it is possible to obtain an actuator having the same effects as those of the above-described linear guide device.

DESCRIPTION OF EMBODIMENTS

Preferred embodiments of a linear guide device and an actuator equipped with the linear guide device according to the present invention will be described below with reference to the accompanying drawings.

First Embodiment

An actuator 12 according to a first embodiment of the present invention is configured as a linear actuator including a linear guide device 10A. In the present embodiment, although an example is described in which the actuator 12 is configured as an electric actuator, the actuator 12 may also be a hydraulic actuator, a pneumatic actuator, or the like.

Figure 1:
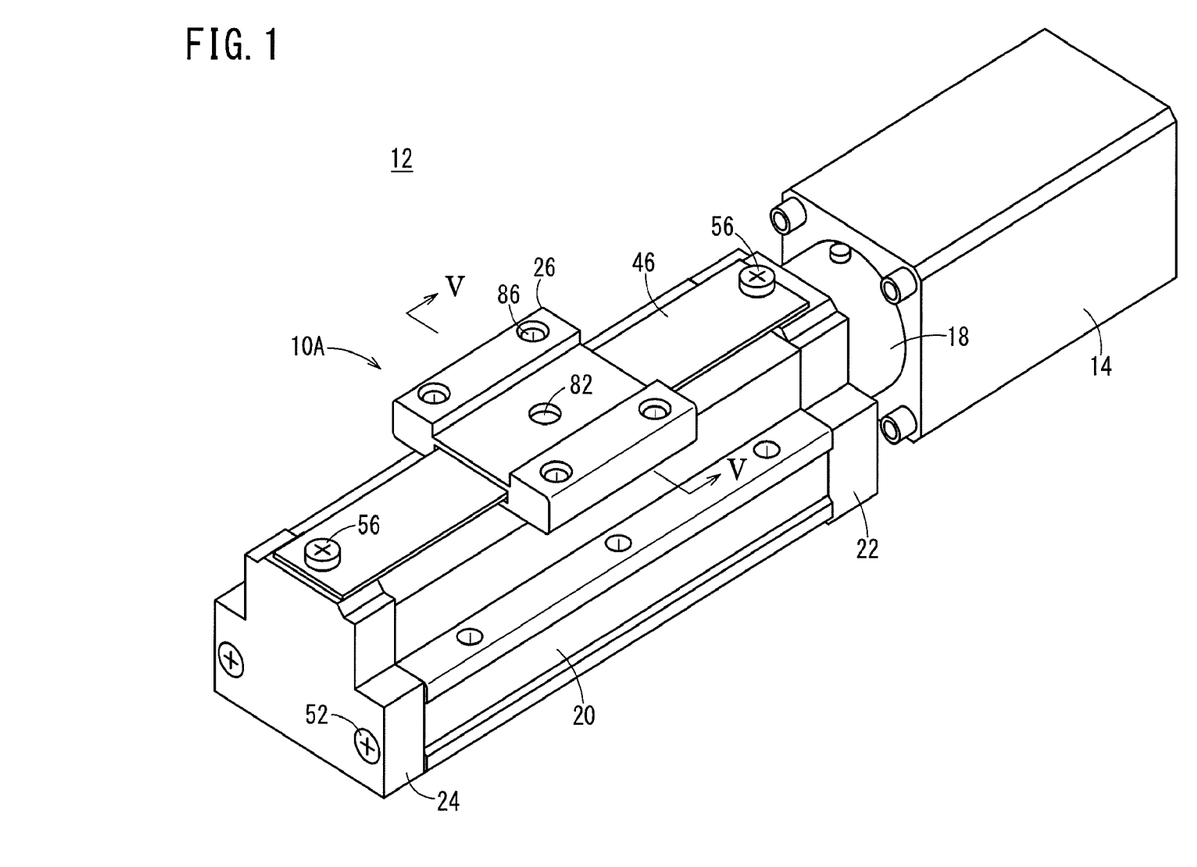
FIG. 1 is a perspective view of an actuator according to a first embodiment of the present invention.
Figure 2:
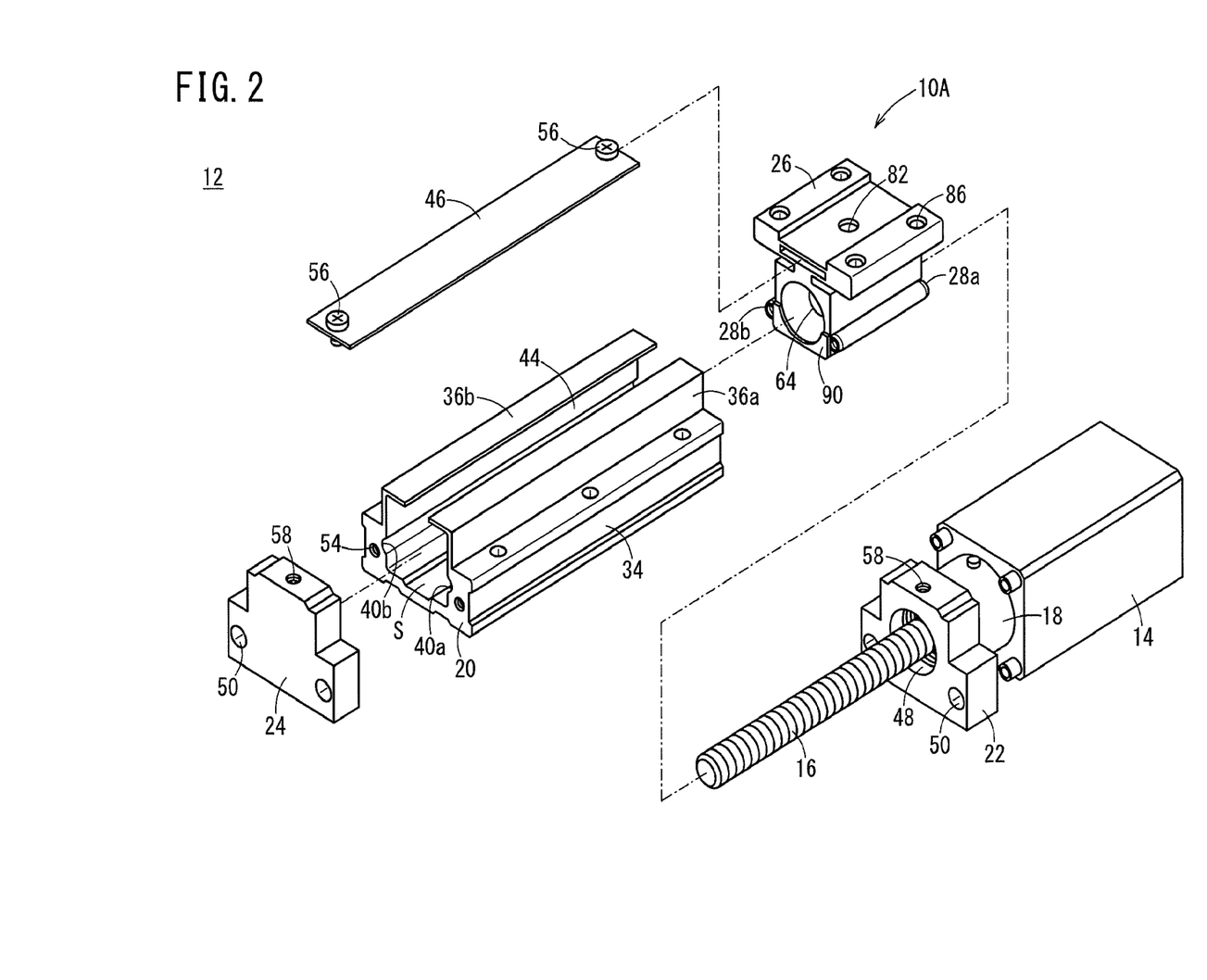
FIG. 2 is an exploded perspective view of the actuator shown in FIG. 1.

As shown in FIGS. 1 and 2, the actuator 12 is equipped with a motor 14 serving as a drive unit, a feed screw shaft 16 that transmits a rotary driving power of the motor 14, and the linear guide device 10A which is disposed on the motor 14 through a housing 18.

The motor 14, for example, may be constituted by a servomotor such as a brush equipped DC motor, a brushless DC motor, a stepping motor, or the like. Further, the motor 14 may also be a linear motor such as a solenoid or the like.

The feed screw shaft 16 is connected to a motor shaft through a non-illustrated coupling. According to the present embodiment, the coupling may be omitted by using the feed screw shaft 16 in common as the motor shaft.

The linear guide device 10A includes a base member (frame) 20 which extends along the axial direction of the feed screw shaft 16, a pair of end plates 22, 24 provided on both ends of the base member 20, a slider 26 disposed slidably with respect to the base member 20, and a plurality (two in the present embodiment) of guide members (guide pins) 28a, 28b arranged between the base member 20 and the slider 26.

Although the base member 20 can be constituted by an arbitrary material, the base member 20, for example, is constituted from aluminum or an aluminum alloy. The base member 20 includes a base member main body 34 formed into a substantially U-shape in cross section, and a pair of protective walls 36a, 36b, which are substantially L-shaped in transverse cross section and which are erected on both sides of the base member main body 34 and bent in directions to approach mutually toward each other, together with extending along the entire length of the base member main body 34. More specifically, in the base member 20, a space S, in which the slider 26 and the guide members 28a, 28b are disposed, is formed by a recessed part of the base member main body 34 and the pair of protective walls 36a, 36b.

On inner side surfaces of the base member main body 34, slide grooves 40a, 40b are formed that correspond with the shapes of the guide members 28a, 28b and span over the entire length thereof. The slide grooves 40a, 40b are disposed one each on respective inner side surfaces of the base member main body 34, so as to face one another substantially in the center in the height direction.

Between the pair of protective walls 36a, 36b, an elongate opening 44 is formed which extends along the axial direction of the feed screw shaft 16 and communicates with the space S of the base member 20. As can be understood from FIG. 1, the opening 44 is covered by a plate-shaped cover member 46. In accordance with this feature, inflow of dust into the space S can be prevented.

In the end plate 22 on the side of the motor 14, a penetrating hole 48 is formed in which the housing 18 is internally fitted and through which the feed screw shaft 16 is inserted. The end plate 24 on the opposite side from the motor 14 closes an opening of the space S of the base member 20. The end plates 22, 24 are joined to the base member 20 by passing screw members 52 (see FIG. 1) through attachment holes 50 formed in both sides of a wide bottom portion of the end plates 22, 24 and then tightening the screw members 52 into screw holes 54 formed in end faces of the base member 20. Further, screw holes 58 in which fixing screws 56 are fastened for fixing the cover member 46 are formed in the end plates 22, 24, respectively.

Figure 3:
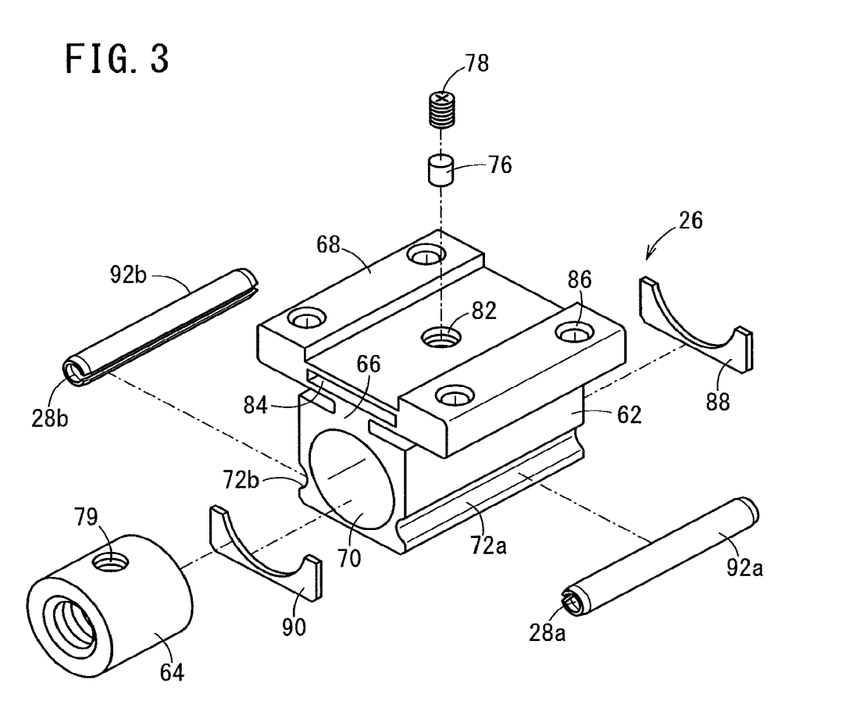
FIG. 3 is an exploded perspective view of a guide member and a slider shown in FIG. 2.
Figure 4:
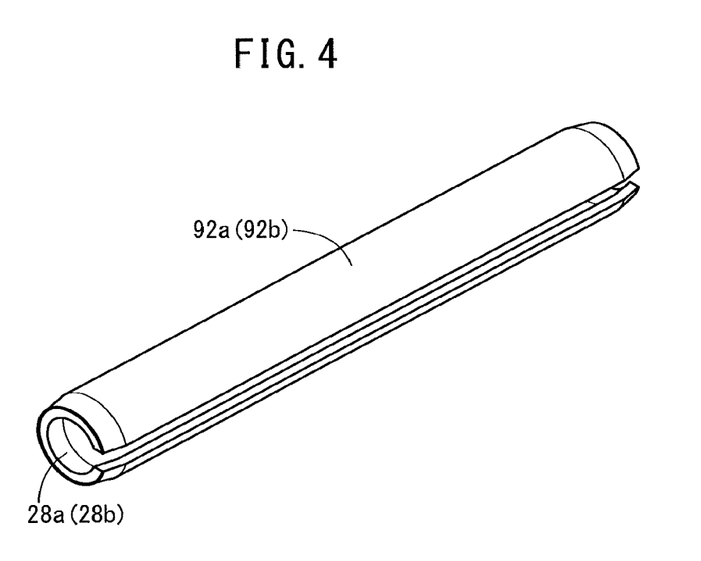
FIG. 4 is an enlarged perspective view of a guide member shown in FIG. 3.
Figure 5:
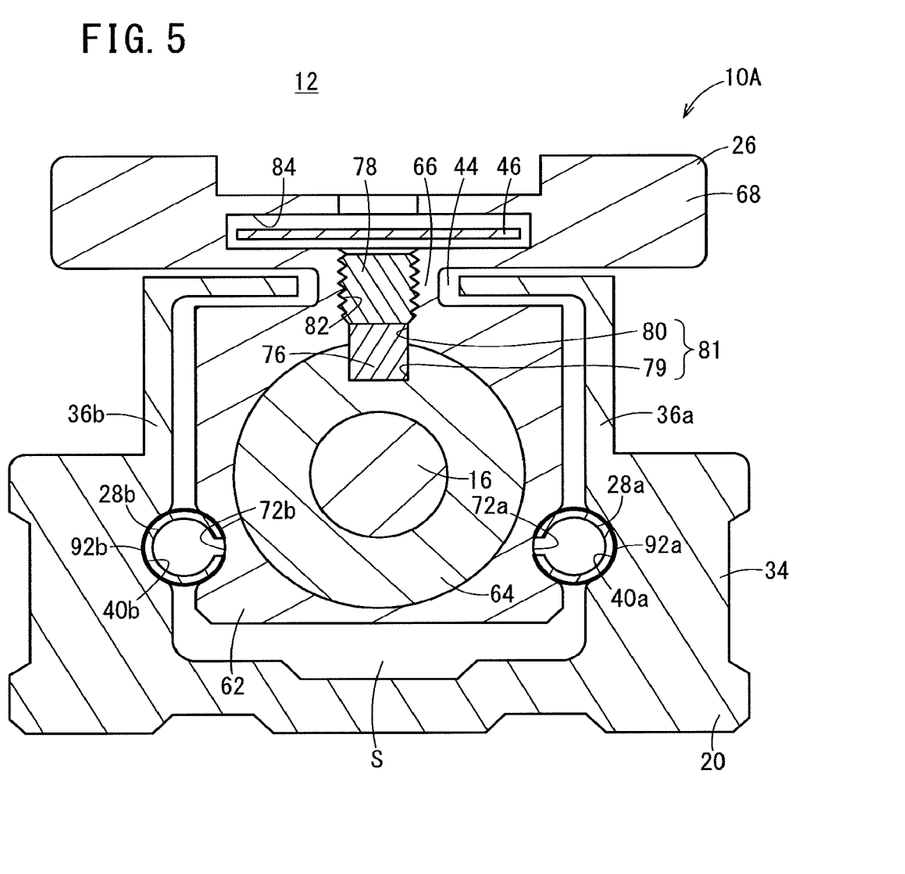
FIG. 5 is a cross-sectional view taken along line V-V of FIG. 1.

As shown in FIGS. 3 through 5, the slider 26 includes a block-shaped (rectangular parallelepiped shaped) slider main body 62 arranged in the space S of the base member 20, a nut 64 that is screwed onto the feed screw shaft 16 in a state of being provided in the slider main body 62, a constricted portion 66 that extends from the slider main body 62 so as to be inserted through the opening 44 of the base member 20, and a table 68 provided on a distal end of the constricted portion 66.

A circular nut arrangement hole 70 in which the nut 64 is arranged is formed in the slider main body 62. Installation grooves 72a, 72b in which the guide members 28a, 28b are disposed are formed in portions of both side surfaces of the slider main body 62 that face toward the slide grooves 40a, 40b. The respective installation grooves 72a, 72b extend along the entire length of the slider main body 62, and the transverse cross sections of groove wall surfaces thereof are arcuately shaped.

The nut 64 is formed in a cylindrical shape, and is displaced in the axial direction accompanying rotation of the feed screw shaft 16. The nut 64 is fixed to the slider main body 62 by a pin 76 and a setscrew 78, in a state with the nut 64 arranged in the nut arrangement hole 70. The pin 76 is disposed in a pin hole 81, which is constituted by a hole 79 that is formed in an outer peripheral surface of the nut 64, and a hole 80 that is formed in a wall surface that makes up the nut arrangement hole 70. The setscrew 78 is screwed into a screw hole 82 that communicates with the pin hole 81 and opens on an outer surface of the table 68, thereby preventing the pin 76 from shifting in position.

The table 68 is formed to be wider than the slider main body 62. An insertion hole 84 through which the cover member 46 is inserted is formed in the table 68. Consequently, the slider 26 does not interfere with the cover member 46 when the slider 26 slides with respect to the base member 20. A plurality of mounting holes 86 for mounting a non-illustrated workpiece or the like are formed in the table 68.

The guide members 28a, 28b are configured to be spring deformable, and by spring restorative force thereof, are fixed in engagement with the wall surfaces that constitute the installation grooves 72a, 72b. More specifically, the guide members 28a, 28b are made of spring steel formed in a C-shaped cross section, respectively. Consequently, the guide members 28a, 28b can reliably be spring deformed with a simple configuration. However, the guide members 28a, 28b can have an arbitrary shape and be made of any arbitrary material, insofar as the guide members 28a, 28b are spring deformable, and by the spring restorative force thereof, are capable of being fixed in engagement with the wall surfaces of the installation grooves 72a, 72b. The guide members 28a, 28b extend at substantially the same length as the installation grooves 72a, 72b, and both ends thereof contact or are placed in close proximity to a pair of stoppers 88, 90 provided on (fixed to) both ends of the slider main body 62 in the axial direction. Consequently, it is possible to suitably suppress displacement of the guide members 28a, 28b with respect to the installation grooves 72a, 72b in the axial direction of the feed screw shaft 16.

Diamond-like carbon films (hereinafter referred to as DLC films 92a, 92b) are formed on outer peripheral surfaces of the guide members 28a, 28b. Therefore, the DLC film 92a contacts the wall surface that makes up the slide groove 40a of the base member 20, whereas the DLC film 92b contacts the wall surface that makes up the slide groove 40b of the base member 20. More specifically, the guide member 28a is fixed in engagement with the slider 26 such that the DLC film 92a is capable of sliding while applying a predetermined pre-load with respect to the base member 20, and the guide member 28b is fixed in engagement with the slider 26 such that the DLC film 92b is capable of sliding while applying a predetermined pre-load with respect to the base member 20.

The DLC films 92a, 92b are amorphous hard films composed of hydrocarbons or allotrope of carbon, which are excellent in lubricity, abrasion resistance, seizure resistance, etc. Therefore, even in the case that the DLC films 92a, 92b are made to undergo sliding in a state with a predetermined pre-load applied to the base member 20, sliding resistance can be kept relatively low. In accordance with this feature, the slider 26 can be allowed to slide smoothly with respect to the base member 20 without the occurrence of backlash or rattling.

The DLC films 92a, 92b can be formed by a CVD (Chemical Vapor Deposition) method, a PVD (Physical Vapor Deposition) method, or the like. Further, in order to improve adhesion of the DLC films 92a, 92b to the substrate material (guide members 28a, 28b), an intermediate layer may be formed between the substrate material and the DLC films 92a, 92b. Such an intermediate layer can be constituted, for example, by a composite layer made up of DLC and the substrate material. In this case, in the intermediate layer, as the distance from the substrate material is smaller, the composition ratio of metal becomes greater, while the composition ratio of the DLC becomes smaller, whereas on the other hand, as the distance from the substrate material is greater, the composition ratio of metal becomes smaller, while the composition ratio of the DLC becomes greater. By using such an intermediate layer, peeling off of the DLC films 92a, 92b from the substrate material can suitably be suppressed.

The actuator 12 according to the present embodiment is constructed basically in the manner described above. Next, operations and advantageous effects of the actuator 12 will be described.

With the actuator 12 according to the present embodiment, when the feed screw shaft 16 is rotated by current being supplied to the motor 14 from a non-illustrated power source, the nut 64 (slider 26) and the guide members 28a, 28b are displaced in unison in the axial direction of the feed screw shaft 16. At this time, since the guide members 28a, 28b is fixed in engagement with the slider 26 such that the DLC films 92a, 92b formed on the outer surfaces of the guide members 28a, 28b is capable of sliding while applying a predetermined pre-load with respect to the base member 20, it is possible for the slider 26 to slide smoothly with respect to the base member 20 without the occurrence of backlash or rattling, together with achieving a reduction in costs.

Further, the guide members 28a, 28b are constituted by spring steel formed in a C-shaped cross section, and therefore, with a simple configuration, the guide members 28a, 28b are spring deformed, and by using the spring restorative force thereof, the guide members 28a, 28b can be fixed by engagement with the wall surfaces of the installation grooves 72a, 72b of the slider 26. In accordance with this feature, a further reduction in costs can be achieved.

Furthermore, since the DLC films 92a, 92b are formed on outer peripheral surfaces of the guide members 28a, 28b, the DLC films 92a, 92b can reliably be placed in contact with the wall surfaces (sliding surfaces) that make up the slide grooves 40a, 40b of the base member 20.

Further still, since the slide grooves 40a, 40b are formed in shapes that correspond to the shapes of the guide members 28a, 28b, the slider 26 can be made to slide more smoothly with respect to the base member 20.

Figure 6:
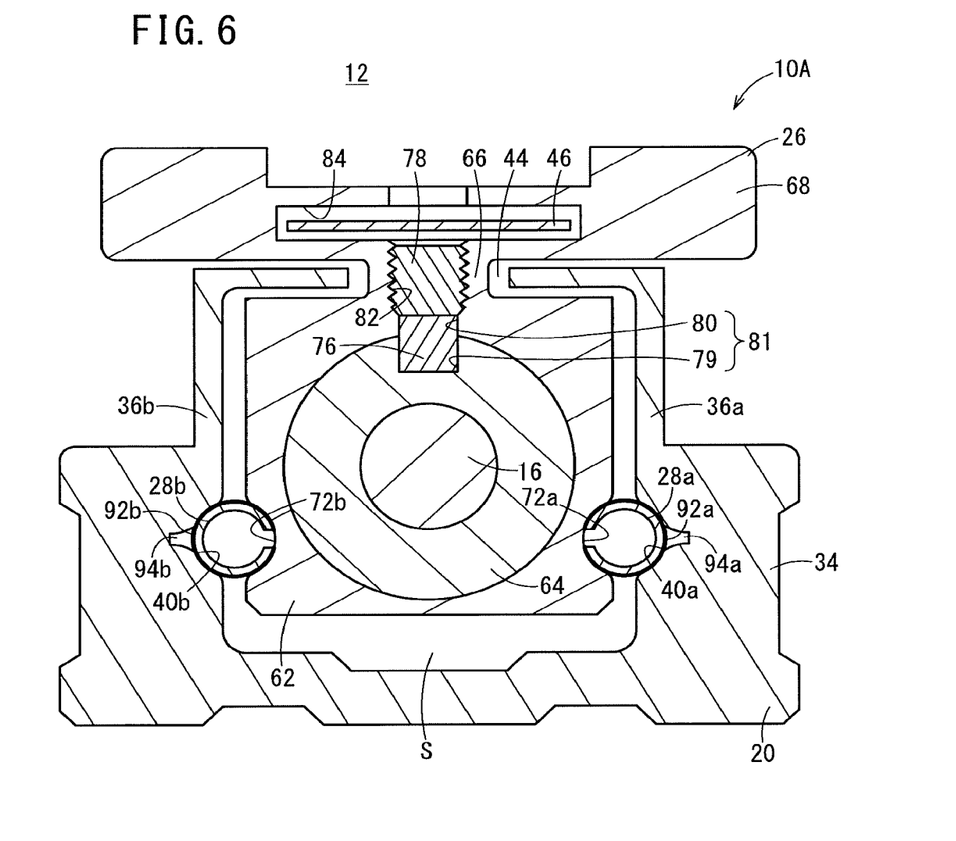
FIG. 6 is a cross-sectional view of an actuator according to a modification of the first embodiment.
Figure 7:
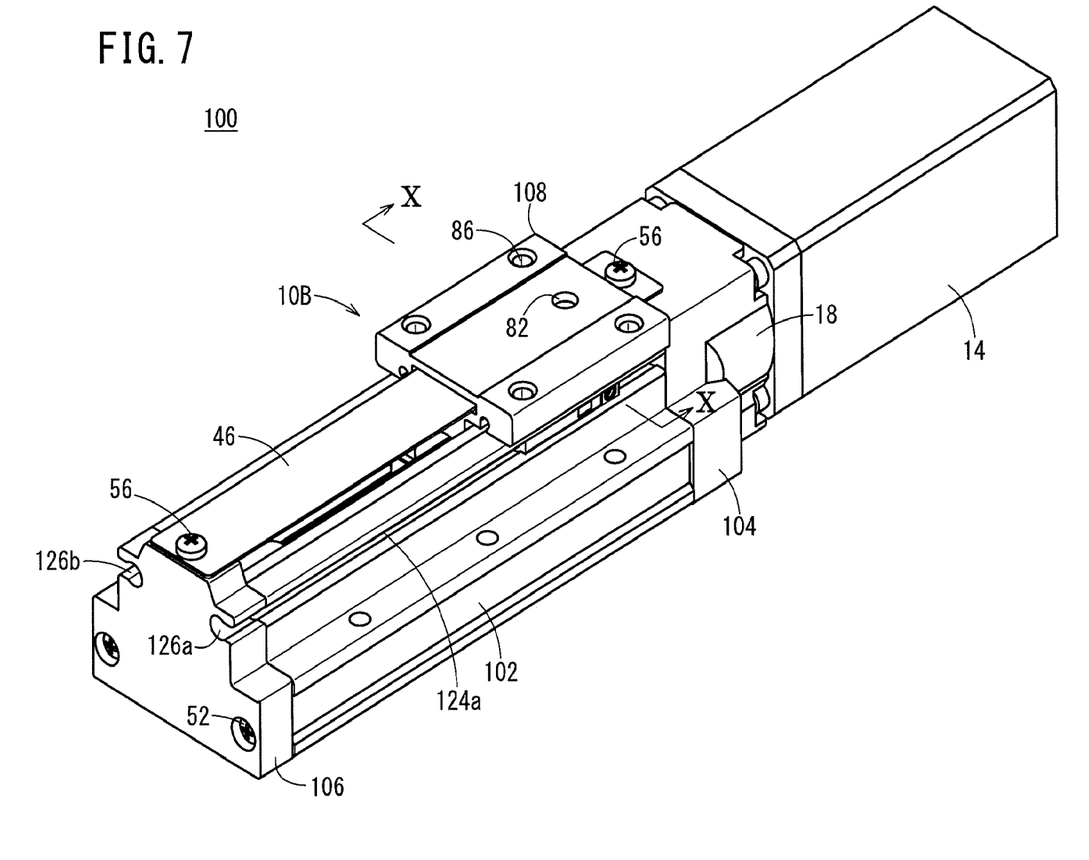
FIG. 7 is a perspective view of an actuator according to a second embodiment of the present invention.
Figure 8:
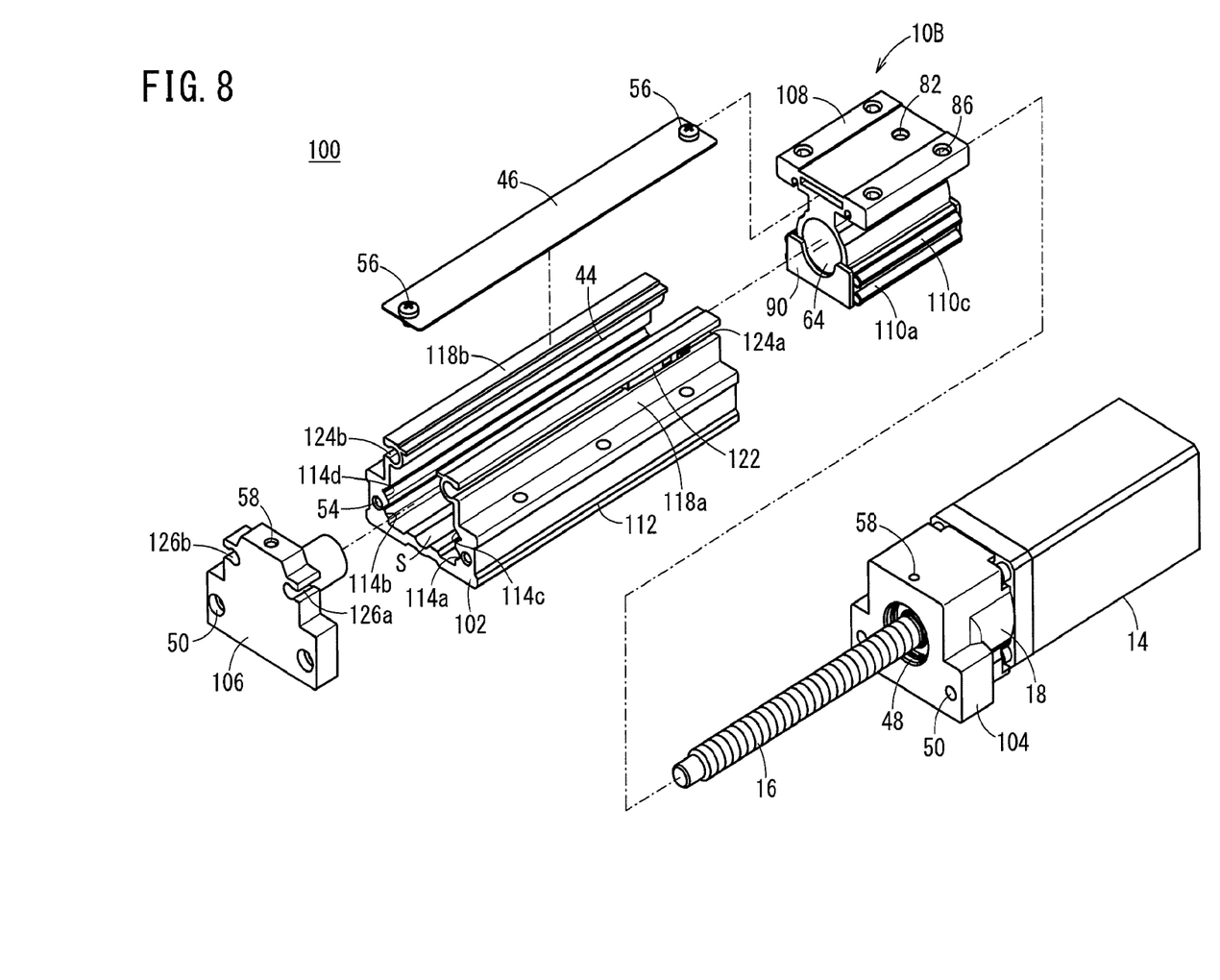
FIG. 8 is an exploded perspective view of the actuator shown in FIG. 7.

As shown in FIG. 6, notches 94a, 94b containing grease (a lubricant) therein may be formed in the wall surfaces that make up the slide grooves 40a, 40b. In this case, since the grease accommodated in the notches 94a, 94b can be supplied between the DLC films 92a, 92b and the wall surfaces that make up the slide grooves 40a, 40b, sliding resistance can be further reduced, and the slider 26 can slide more smoothly with respect to the base member 20.

Second Embodiment

Next, an actuator 100 according to a second embodiment of the present invention will be described with reference to FIGS. 7 through 10. In the actuator 100 according to the second embodiment, elements thereof that offer the same or similar functions and effects as those of the actuator 12 according to the first embodiment are denoted using the same reference characters, and detailed description of such features is omitted.

As shown in FIGS. 7 through 10, the configuration of the linear guide device 10B of the actuator 100 according to the present embodiment differs from the linear guide device 10A of the aforementioned actuator 12. More specifically, the linear guide device 10B includes a base member 102, a pair of end plates 104, 106, a slider 108 disposed so as to be capable of sliding with respect to the base member 102, and a plurality (four in the present embodiment) of guide members (guide pins) 110*a* to 110*d* arranged between the base member 102 and the slider 108.

Figure 10:
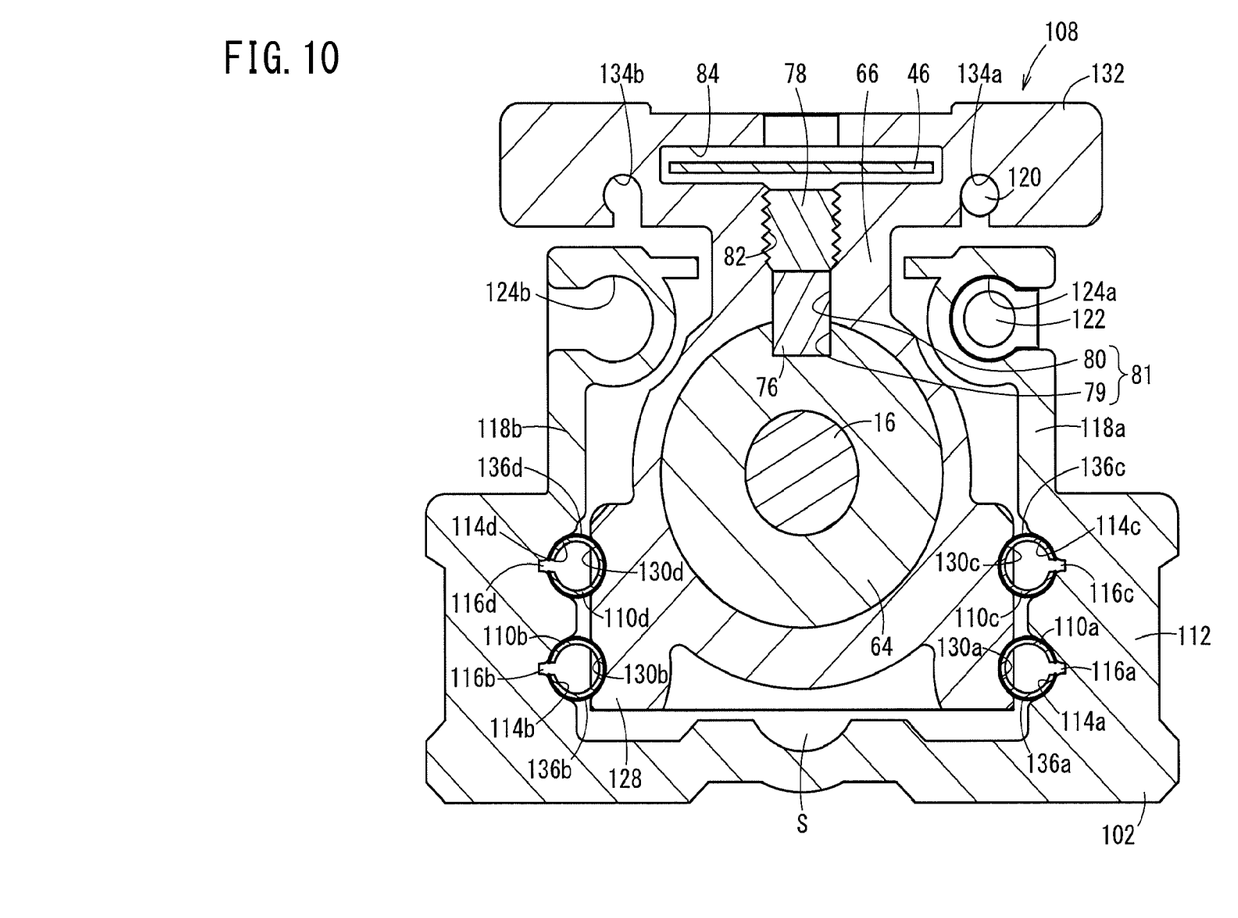
FIG. 10 is a cross-sectional view taken along line X-X of FIG. 7.

On inner side surfaces of a base member main body 112 that constitutes the base member 102, a plurality (four as shown in FIG. 10) of slide grooves 114*a* to 114*d* are formed that span over the entire length thereof. The slide grooves 114*a* to 114*d* are provided two each on respective inner side surfaces of the base member main body 112. The slide groove 114*a* and the slide groove 114*b* face one another on the bottom surface side of the base member main body 112, whereas the slide groove 114*c* and the slide groove 114*d* face one another on a side opposite from the bottom surface. Transverse cross sections of the wall surfaces that make up each of the slide grooves 114*a* to 114*d* are arcuately shaped, and on groove bottom surfaces thereof, notches 116*a* to 116*d* are formed to span across the entire length thereof (see FIG. 10).

On respective protective walls 118*a*, 118*b* that constitute part of the base member 102, auto switch grooves 124*a*, 124*b*, in which an auto switch 122 is installed that detects magnetism from a magnet 120 disposed on the slider 108, are formed spanning across the entire length thereof. The auto switch grooves 124*a*, 124*b* face each other mutually so as to sandwich the constricted portion 66 of the slider 108 therebetween.

Each of the auto switch grooves 124*a*, 124*b* has a shape corresponding to the shape of the auto switch 122, and the groove width on the groove bottom surface side (the side of the constricted portion 66) is greater than the groove width on the opening side thereof. More specifically, the transverse cross sections on the bottom surface sides of the respective auto switch grooves 124*a*, 124*b* are formed in arcuate shapes.

Consequently, the auto switch 122 can be prevented from becoming disengaged from the auto switch groove 124*a* or the auto switch groove 124*b*. Moreover, as understood from FIGS. 7 and 8, in an end plate 106, insertion grooves 126*a*, 126*b*, which have the same shape as the auto switch grooves 124*a*, 124*b*, are formed so as to communicate with the auto switch grooves 124*a*, 124*b*. Thus, through the insertion grooves 126*a*, 126*b*, attachment and detachment of the auto switch 122 with respect to the auto switch grooves 124*a*, 124*b* can easily be carried out.

Figure 9:
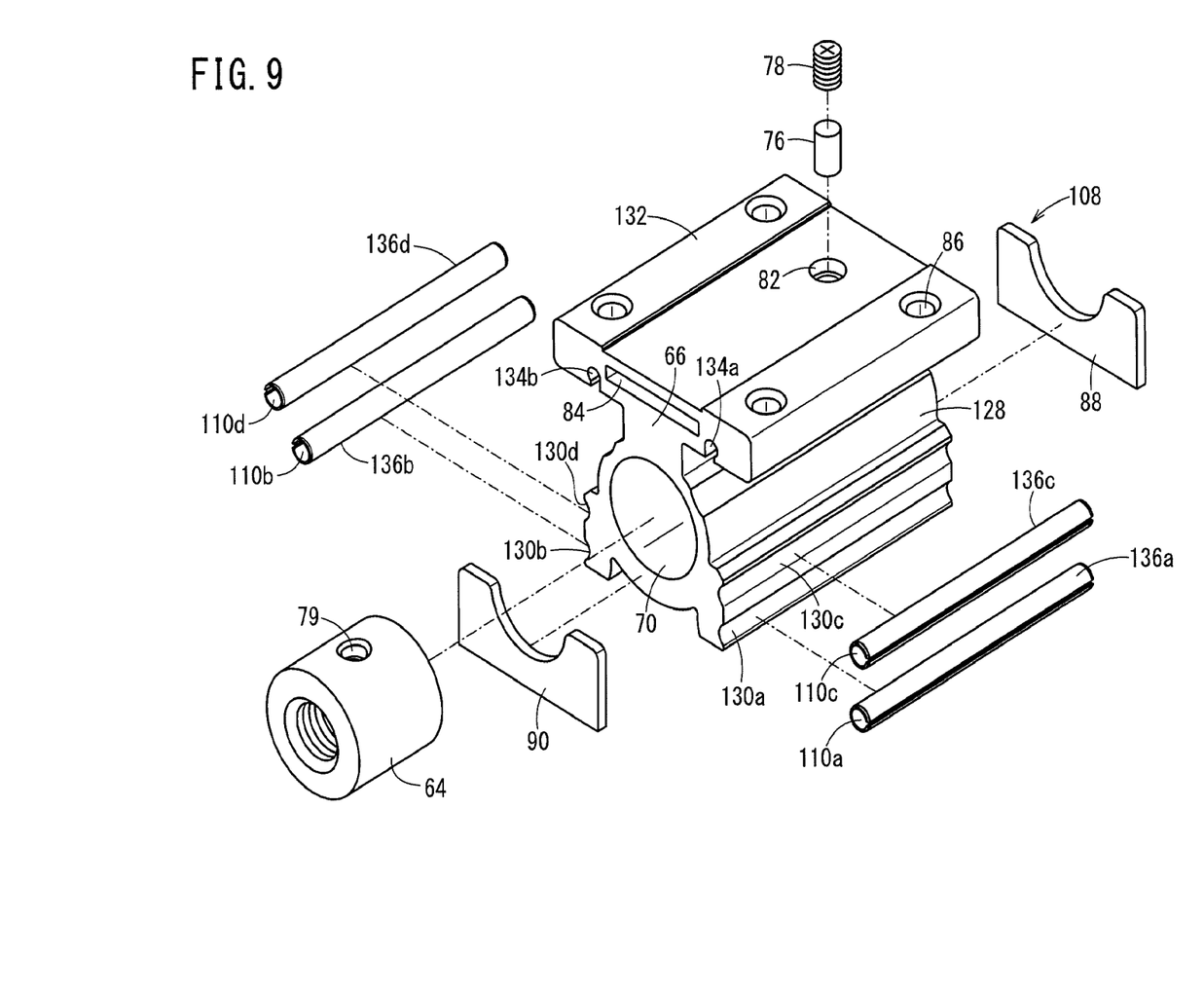
FIG. 9 is an exploded perspective view of a guide member and a slider shown in FIG. 8.

Portions of the slider main body 128 of the slider 108 that face toward the protective walls 118*a*, 118*b* are curved along the outer peripheral surface of the nut 64, and the portions thereof are partly cut out. In accordance with this feature, an increase in the size of the linear guide device 10B as a result of providing the auto switch grooves 124*a*, 124*b* can be suppressed while enabling the slider 108 to be made lighter in weight.

Installation grooves 130*a* to 130*d* in which the guide members 110*a* to 110*d* are arranged are formed in portions of both side surfaces of the slider main body 128 that face toward the slide grooves 114*a* to 114*d*. The installation grooves 130*a* to 130*d* are constituted in the same manner as the aforementioned installation groove 72*a*. At locations of a table 132 of the slider 108 that face toward the auto switch grooves 124*a*, 124*b*, magnet attachment grooves 134*a*, 134*b* are formed in which a magnet 120 is installed. Consequently, magnetism from the magnet 120 can be detected efficiently by the auto switch 122.

The respective guide members 110*a* to 110*d* are constituted in the same manner as the aforementioned guide member 28*a*. As can be understood from FIG. 10, the guide members 110*a* to 110*d* are arranged between the base member main body 112 and the slider 108 such that side holes thereof, which open on outer peripheral surfaces of the guide members 110*a* to 110*d*, are positioned in the interiors of the slide grooves 114*a* to 114*d*. More specifically, the side holes of the guide members 110*a* to 110*d* face toward the notches 116*a* to 116*d*.

In accordance with this feature, corner portions (edge portions), which are formed at the boundary between the wall surfaces that constitute the side holes and the outer peripheral surfaces of the guide members 110*a* to 110*d*, are prevented from coming into contact with the wall surfaces of the slide grooves 114*a* to 114*d*. The guide members 110*a* to 110*d* are fixed by engagement with the wall surfaces that make up the installation grooves 130*a* to 130*d*, by the spring deformation (spring restorative force) of the guide members 110*a* to 110*d* themselves, such that the DLC films 136*a* to 136*d* are capable of sliding in a state of applying a predetermined pre-load with respect to the base member 102.

Further, according to the present embodiment, inner holes of the guide members 110*a* to 110*d* and the notches 116*a* to 116*d* function as grease reservoirs (oil reservoirs). More specifically, grease (a lubricant) that is contained inside the inner holes of the guide members 110*a* to 110*d* and the notches 116*a* to 116*d* is supplied to areas between the DLC films 136*a* to 136*d* and the wall surfaces that make up the slide grooves 114*a* to 114*d*. In accordance with this feature, the slider 108 slides more smoothly with respect to the base member 102.

According to the present embodiment, the same advantages and effects as those of the linear guide device 10A and the actuator 12 according to the first embodiment are obtained. Further, side holes that open on outer peripheral surfaces of the guide members 110*a* to 110*d* are positioned in the interiors of the slide grooves 114*a* to 114*d*, together with grease being accommodated in the inner holes of the guide members 110*a* to 110*d*. Therefore, when the slider 108 is made to slide with respect to the base member 102, grease can be supplied between the DLC films 136*a* to 136*d* and the wall surfaces that make up the slide grooves 114*a* to 114*d*, and sliding resistance can be reduced. In accordance with this feature, the slider 108 can be allowed to slide more smoothly with respect to the base member 102.

Furthermore, since the notches 116*a* to 116*d* are formed at sites of the wall surfaces of the slide grooves 114*a* to 114*d* that face toward the side holes, grease that is contained in the inner holes of the guide members 110*a* to 110*d* can be supplied efficiently through the notches 116*a* to 116*d* to areas between the DLC films 136*a* to 136*d* and the wall surfaces of the slide grooves 114*a* to 114*d*. Further, it is possible to suitably prevent the corner portions, which are formed at the boundary between the wall surfaces of the side holes and the outer peripheral surfaces of the guide members 110*a* to 110*d*, from hitting against and causing damage to the wall surfaces of the slide grooves 114*a* to 114*d*.

The linear guide device and the actuator according to the present invention are not limited to the embodiments described above, and it goes without saying that various modified or additional configurations can be adopted therein without deviating from the essential gist of the present invention.

The invention claimed is:

1. A linear guide device comprising:
  a base member;
  a slider disposed slidably on the base member; and
  a guide member, which is disposed between the base member and the slider so as to extend in a slide direction of the slider;
  wherein a diamond-like carbon film is formed on the guide member, and the guide member is fixed by engagement with the slider in a manner in which the diamond-like carbon film is slidable in a state of applying a predetermined pre-load to the base member, an installation groove in which the guide member is arranged is formed in the slider; and the guide member is made of spring steel, is formed with a C-shaped cross section, and is fixed by engagement with a wall surface of the installation groove by a spring restorative force of the guide member.

2. The linear guide device according to claim 1, wherein the diamond-like carbon film is formed on an outer peripheral surface of the guide member.

3. The linear guide device according to claim 2, wherein a slide groove having a shape that corresponds with a shape of the guide member is formed in the base member.

4. The linear guide device according to claim 3, wherein:
a lubricant is contained in an inner hole of the guide member; and
the guide member is disposed between the base member and the slider in a manner that a side hole, which opens on the outer peripheral surface of the guide member, is positioned in the slide groove.

5. The linear guide device according to claim 4, wherein a notch is formed in a portion of a wall surface of the slide groove that faces toward the side hole.

6. The linear guide device according to claim 3, wherein a notch containing a lubricant therein is formed in a wall surface of the slide groove.

7. An actuator comprising:
a linear guide device; and
a drive unit configured to drive a slider of the linear guide device;
wherein the linear guide device comprising:
a base member;
the slider disposed slidably on the base member; and
a guide member, which is disposed between the base member and the slider so as to extend in a slide direction of the slider;
wherein
a diamond-like carbon film is formed on the guide member, and the guide member is fixed by engagement with the slider in a manner in which the diamond-like carbon film is slidable in a state of applying a predetermined pre-load to the base member,
an installation groove in which the guide member is arranged is formed in the slider; and
the guide member is made of spring steel, is formed with a C-shaped cross section, and is fixed by engagement with a wall surface of the installation groove by a spring restorative force of the guide member.

* * * * *